Jan. 12, 1943. E. W. SCHELLENTRAGER 2,307,961
AUTOMATIC WEIGHT RECORDING SYSTEM
Filed Feb. 15, 1941
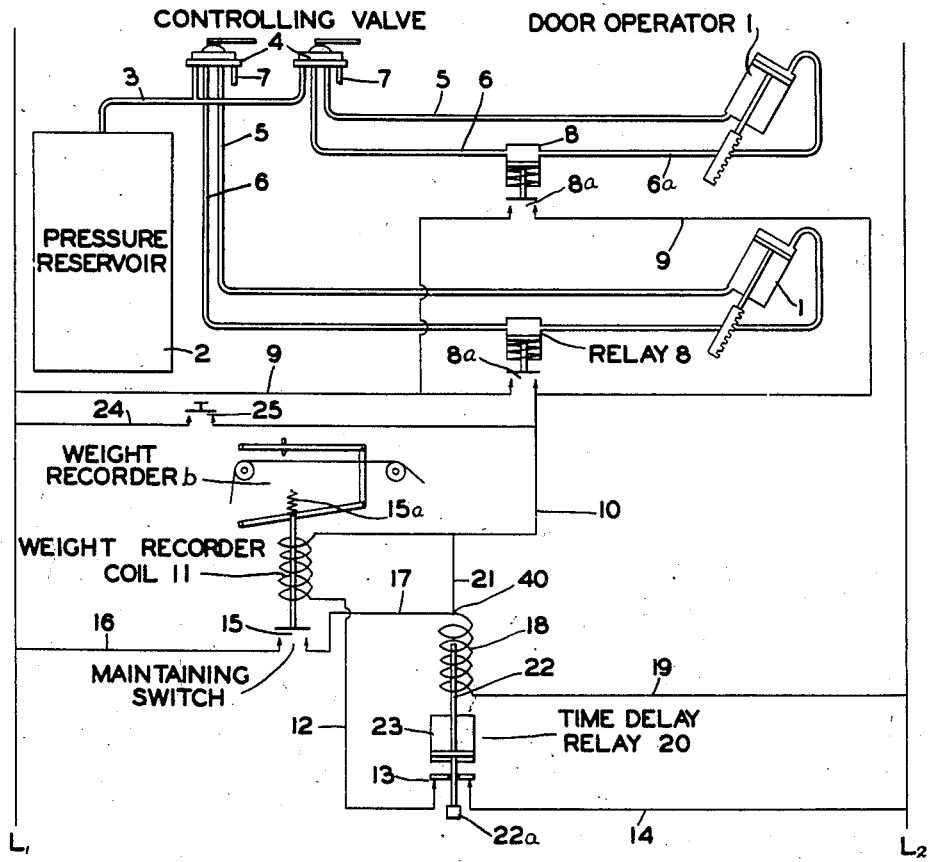
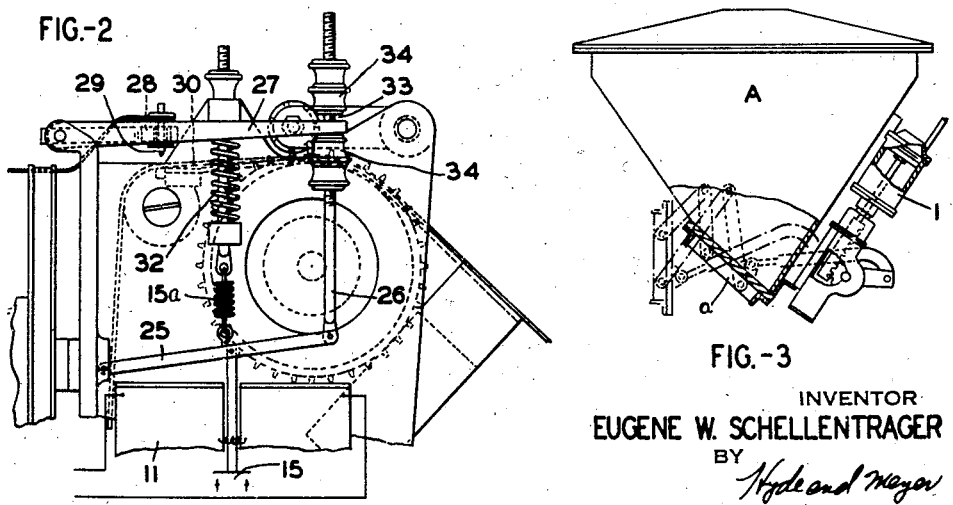
INVENTOR
EUGENE W. SCHELLENTRAGER
BY
*Hyde and Meyer*
ATTORNEYS Patented Jan. 12, 1943

2,307,961

UNITED STATES PATENT OFFICE 2,307,961

AUTOMATIC WEIGHT RECORDING SYSTEM

Eugene W. Schellentrager, Shaker Heights, Ohio, assignor to The Atlas Bolt & Screw Company, Cleveland, Ohio, a corporation of Ohio Application February 15, 1941, Serial No. 379,113

5 Claims. (Cl. 265—2)

This invention relates to weight recording means for dump cars and more particularly to improvements in such recording means whereby the record is made automatically upon initiation of a car dumping operation and wherein the record is unaffected by further manipulation of the car dumping equipment, until after the lapse of a reasonable time delay period.

An object of the present invention is to make a record automatically before dumping a loaded car and to prevent action of the weight recording apparatus which would mar the record if the dumping mechanism is rapidly energized and de-energized for the purpose of banging the dumping doors to free the car of its contents.

Other objects and advantages of the invention will be apparent from the accompanying drawing and specification and the essential features thereof will be summarized in the claims.

In the drawing, Fig. 1 is a diagrammatic view, illustrating one embodiment of the invention as applied to a dumping scale car; Fig. 2 is a detail view illustrating the weight recording mechanism; and Fig. 3 is a detail view of the car door operating mechanism.

The invention here disclosed has many useful applications, for example, in connection with dumping scale cars such as are used for loading the skip hoist when charging blast furnaces, or for any other operations where mixed loads are delivered to a receiver and where it is desired to automatically produce a record of the weight of all material in the car before the same is dumped. A more complete description of equipment of this sort designed for use with my improved control apparatus may be found in my patent for Weight recording mechanism for dump cars, No. 2,237,845, granted April 8, 1941, and further description is thought unnecessary here, as this invention involves the control mechanism rather than the details of the car and the weight recorder. The weighing and recording devices may be of the form shown in Patent No. 1,329,567 granted February 3, 1920, to Samson D. Wright, although other recording apparatus may be utilized as will be understood by those skilled in this art.

In the drawing, a cylinder and piston motor 1 is illustrated for the purpose of controlling the car dumping doors $a$ on car A. Pressure fluid is supplied to these motors (one for each door) from a pressure fluid reservoir 2 by way of conduit 3 and an engineer's brake valve 4 which is of the four-way type adapted to supply pressure fluid through conduit 5 or 6 to either end of motor 1 or to exhaust pressure from either end through the exhaust outlet 7. A relay 8 is provided in each of these systems responsive to movement of the control valve 4. In some cases it is sufficient as indicated here to place the relay servomotor 8 close to the control valve 4 with the conduit $6a$ connecting motors 8 and 1 of sufficient length or restriction so that pressure does not build up to operate the motor 1 until a safe period after the servomotor 8 has been energized or actuated. If necessary or desirable the invention disclosed and claimed in my above mentioned patent may be incorporated here to insure that the motor 1 does not operate until a predetermined period after the servomotor 8 has been energized. Each of the servomotors 8 controls a normally open switch $8a$ which is adapted, when closed, to complete an electrical circuit between the electric supply lines $L_1$ and $L_2$. This circuit is from $L_1$ through line 10, coil 11, line 12, normally closed switch 13 and line 14, and also from line 10, by line 21, coil 18 and line 19, to $L_2$. Coils 11 and 18 are thus simultaneously energized. The coil 11 serves as the operating coil for the weight recording means, marked generally $b$ in Fig. 1. As before stated, this weight recording means may be of any suitable form designed upon energization of coil 11 to instantaneously produce but one record, without continuance or repetition of the record until the coil is again energized. In other words, it is of the impact variety. Fig. 2 illustrates it as of the form shown in said Patent No. 1,329,567, to which reference may be had if desirable or necessary. As illustrated, the coil 11 actuates a pivoted armature 25 connected by a link 26 to a pivoted arm 27, motion of which is communicated to the bars 28 between which travels the stylus 29 adapted to engage the paper or other record sheet 30. Spring $15a$ biases the armature lever 25 upwardly and spring 32 exerts like effect upon arm 27, while the lost motion, at 33, between arm 27 and two nuts 34 on the link 26, produces the impact effect, causing overthrow of the stylus, when operated, to produce a single recording mark, and enabling it to immediately retire from the record sheet, even though the coil 11 remains energized. Thus a single mark or puncture is produced on the sheet for each energization of coil 11, with no continuance of the record mark so long as the coil remains energized.

Coil 11 also serves another purpose, to-wit, to establish a maintaining circuit not only for itself, but also for the coil 18 of time delay relay 20, to maintain it energized for a brief time period. This it accomplishes by closing the normally open switch 15 against the effect of its biasing spring $15a$, thus completing a circuit from $L_1$ by wire 16, switch 15, and wire 17 to the point 40, from which point current may flow through coil 18 and wire 19 to $L_2$, and also, by wire 21, to wire 10, through coil 11 and thence to $L_2$, when the current supply by wire 10 fails on account of opening of the switch $8a$, as occurs when the engineer's valve 4 is operated repeatedly to bang the doors for the purpose of shaking loose any sticky load in the car.

The time delay relay 20 includes an armature 22 movable in response to energization of coil 18 and the movement of which downwardly is unretarded but which in an upward direction is retarded by the dashpot 23. Upon completion of the upward travel of the armature 22, after energization of coil 18, the abutment 22a of the armature opens switch 13. This of course will deenergize coil 11 permitting switch 15 to open which in turn deenergizes coil 18 and permits switch 13 to again move to closed position. All parts are now restored to their original positions, so that the next operation of one of the engineer's valves 4 again actuates a relay 8, 8a, thus causing the weight recording mechanism to produce another record, which again cannot be repeated until after the lapse of the time delay period determined by dashpot 23.

Manual means is provided including line 24 and switch 25 for energizing the operating coil 11 for the weight recording means whenever desired.

The operation of my improved device is as follows: The dump car A is loaded with material and if the weights of various part-loads are to be recorded, then the switch 25 is closed by hand as each different material is added to the car. The completely loaded car is then moved to a desired dumping point where at least one of the valves 4 is manipulated to supply pressure fluid to one end of motor 1 to cause opening of the car dumping door a. Prior to the building up of sufficient fluid pressure to cause this dumping operation, however, the servomotor 8 will be actuated to close the normally open first relay switch 8a. This energizes the second relay coil 11 causing a record of the total weight in the car. At the same time the maintaining circuit through switch 15 is closed thus holding the coil 11 energized and at the same time energizing coil 18 to start the time delay relay in operation. The operator may now manipulate the valve 4 to provide reciprocating movements of motor 1 to shake the car doors if necessary to dislodge material during the dumping operation. If it were not for the maintaining circuit through the coil 11, and the fact that the recorder operated by that coil produces but one instantaneous record each time the coil is energized, each manipulation of valve 4 with its consequent opening and closing of the switch 8a would cause another actuation of the operator for the weight recording means so that an improper and unsatisfactory record would be made. By my improved apparatus, however, the weight recorder is held unaffected during this period because of the maintaining circuit holding coil 11 energized. Upon the lapse of a predetermined time the time delay relay 20 opens switch 13 to deenergize all circuits and to permit the parts to return to their original positions ready for another operation. Obviously the time period set for operation of the time delay relay 20 is sufficient to permit any desired manipulation of the doors during the car dumping operation.

What I claim is:

1. Apparatus of the character described, comprising the combination with a car having weight recording apparatus and a car dumping door and power means for opening said door, of a control member for said power means, a relay for operating said weight recording apparatus, means for initially energizing said relay by movement of said control member, and means established by said last named means for holding said relay energized independently of repeated operation of said control member.

2. Apparatus of the character described, comprising the combination with a car having weight recording apparatus and a car dumping door and power means for opening said door, of a control member for said power means, a relay for operating said weight recording apparatus, means for initially energizing said relay by movement of said control member, means established by said last named means for holding said relay energized independently of repeated operation of said control member, and time delay means for deenergizing said relay energizing means.

3. Apparatus for automatically recording varying weights, including a car adapted to receive loads of different weights and provided with a recorder for making a record of said weights, power means for dumping said car, power supply means, an operative connection therefrom to said power means and including an operator operated controller, a first relay operable in response to operation of said controller, a second relay for operating said recording means operable in response to operation of said first relay, a power circuit independent of said first relay, established by actuation of said first relay, and said circuit having an operative connection with said second relay for holding the latter unaffected by further actuation of said first relay.

4. Apparatus for automatically recording varying weights, including a car adapted to receive loads of different weights and provided with a recorder for making a record of said weights, power means for dumping said car, power supply means, an operative connection therefrom to said power means and including an operator operated controller, a first relay operable in response to operation of said controller, a second relay for operating said recording means operable in response to operation of said first relay, a power circuit independent of said first relay established by actuation of said first relay, said circuit having an operative connection with said second relay for holding the latter unaffected by further actuation of said first relay, and time delay means for opening said circuit.

5. Apparatus of the character described, comprising the combination of a dumping car having weight recording means and power means for dumping said car, control means for said power means, relay means energized by actuation of said control means and adapted when energized to produce one operation of said weight recording means, holding means operated by said relay means for maintaining said relay means energized and thereby ineffective to produce a second operation of said weight recording means, and time delay means also energized by said relay means and arranged after the lapse of a time delay period to become effective upon said holding means to deenergize the relay means and thereby prepare it for another operation.

EUGENE W. SCHELLENTRAGER.